(12) United States Patent
Winkelnkemper et al.

(10) Patent No.: US 8,760,892 B2
(45) Date of Patent: Jun. 24, 2014

(54) METHOD AND APPARATUS FOR OPERATION OF A CONVERTER CIRCUIT HAVING PLURAL PHASE MODULES AND SUB-CONVERTER SYSTEMS FOR THE PHASE MODULES

(75) Inventors: Manfred Winkelnkemper, Ennetbaden (CH); Arthur Korn, Baden (CH)

(73) Assignee: ABB Schweiz AG, Baden (CH)

( * ) Notice: Subject to any disclaimer, the term of this patent is extended or adjusted under 35 U.S.C. 154(b) by 441 days.

(21) Appl. No.: 13/024,756

(22) Filed: Feb. 10, 2011

(65) Prior Publication Data

US 2011/0194323 A1 Aug. 11, 2011

(30) Foreign Application Priority Data

Feb. 11, 2010 (EP) .................................... 10153349

(51) Int. Cl.
*H02M 7/00* (2006.01)
(52) U.S. Cl.
USPC .......................................................... 363/65
(58) Field of Classification Search
USPC .......... 363/65, 68, 70, 71, 39, 40, 45, 46, 95, 363/97, 98, 131, 132
See application file for complete search history.

(56) References Cited

U.S. PATENT DOCUMENTS

| | | |
|---|---|---|
| 2008/0232145 A1 | 9/2008 | Hiller et al. |
| 2008/0310205 A1 | 12/2008 | Hiller |
| 2010/0067266 A1 * | 3/2010 | Dommaschk et al. .......... 363/64 |

FOREIGN PATENT DOCUMENTS

| | | |
|---|---|---|
| WO | WO 2007/023064 A1 | 3/2007 |
| WO | WO 2007/033852 A2 | 3/2007 |
| WO | WO 2008/067784 A1 | 6/2008 |

OTHER PUBLICATIONS

A. Antonopoulos et al., "On Dynamics and Voltage Control of the Modular Multilevel Converter", Power Electronics and Applications, 2009, 10 pages.
European Search Report dated Jun. 18, 2010.

* cited by examiner

*Primary Examiner* — Adolf Berhane
(74) *Attorney, Agent, or Firm* — Buchanan Ingersoll & Rooney PC

(57) ABSTRACT

A method is provided for operation of a converter circuit. The converter circuit has at least two phase modules, where each phase module has a first and a second sub-converter system, and the sub-converter systems for each phase module are connected in series with one another. Each sub-converter system includes a plurality of series-connected two-pole switching cells. In the method, the control signals for the switching cells are additionally formed from a damping signal. The damping signal is formed from a measured current through the respective sub-converter system and from a predeterminable resistance value, in order to attenuate undesirable currents in the sub-converter systems.

10 Claims, 5 Drawing Sheets

METHOD AND APPARATUS FOR OPERATION OF A CONVERTER CIRCUIT HAVING PLURAL PHASE MODULES AND SUB-CONVERTER SYSTEMS FOR THE PHASE MODULES

RELATED APPLICATIONS

This application claims priority under 35 U.S.C. §119 to European Patent Application No. 10153349.5 filed in Europe on Feb. 11, 2010, the entire content of which is hereby incorporated by reference in its entirety.

FIELD

The disclosure relates to the field of power electronics, and relates in particular to a method for operation of a converter circuit according to the preamble of the independent claims.

BACKGROUND INFORMATION

Converter circuits are used in a multiplicity of applications. One converter circuit whose voltage can be scaled easily is specified in WO 2007/023064 A1. FIG. 1 illustrates a converter circuit such as the converter circuit disclosed in WO 2007/023064 A1, although, for the sake of clarity, FIG. 1 illustrates only one phase module of the converter circuit. The converter circuit therein has one phase module for each phase, where each phase module includes a first and a second sub-converter system, and the sub-converter systems are connected in series with one another. The junction point between the two series-connected sub-converter systems forms an outlet connection, for example, for an electrical load. Each sub-converter system includes at least one two-pole switching cell. The switching cells are connected in series with one another when there are a plurality of switching cells in one sub-converter system. Each two-pole switching cell has controllable bidirectional power semiconductor switches with a controlled unidirectional current-flow direction, and a capacitive energy store. In FIG. 1, each switching cell has two series-connected controllable bidirectional power semiconductor switches with a controlled unidirectional current-flow direction, and a capacitive energy store connected in parallel with the series circuit by the power semiconductor switches. A converter circuit of this generic type is also specified in WO 2007/33852 A2.

Since the converter circuit according to WO 2007/023064 A1 or according to WO 2007/33852 A2 contains weakly damped resonant circuits, consisting of two or more phase modules, the oscillations which occur therein must be damped for control-engineering purposes in the currents through the first and the second sub-converter systems. In this context, WO 2007/33852 A2 specifies a control method which is based on the principle of freely selectable time intervals for switching operations of the controllable bidirectional power semiconductor switches in the switching cells in the first and second sub-converter systems.

SUMMARY

An exemplary embodiment provides a method for operation of a converter circuit. The converter circuit has at least two phase modules, where each phase module has a first converter system and a second sub-converter system, the sub-converter systems for each phase module are connected in series with one another, each sub-converter system includes a plurality of series-connected two-pole switching cells, and each switching cell has controllable bidirectional power semiconductor switches with a controlled unidirectional current-flow direction and a capacitive energy store. The exemplary method includes controlling the power semiconductor switches in the switching cells in the first sub-converter system by means of a first control signal, and controlling the power semiconductor switches in the switching cells in the second sub-converter system by means of a second control signal. The exemplary method also includes forming the control signal for the first sub-converter system formed from a reference signal with respect to the voltage across the first sub-converter system. In addition, the exemplary method includes forming the second control signal for the second sub-converter system from a reference signal with respect to the voltage across the second sub-converter system. The first control signal is additionally formed from a first damping signal with respect to the first sub-converter system, where the first damping signal is formed from a measured current through the first sub-converter system and from a predeterminable resistance value. The second control signal is additionally formed from a second damping signal with respect to the second sub-converter system, the second damping signal being formed from a measured current through the second sub-converter system and from the predeterminable resistance value.

An exemplary embodiment provides a method for operation of a converter circuit. The converter circuit has at least two phase modules, where each phase module has a first sub-converter system and a second sub-converter system, the sub-converter systems for each phase module are connected in series with one another, each sub-converter system includes a plurality of series-connected two-pole switching cells, and each switching cell has controllable bidirectional power semiconductor switches with a controlled unidirectional current-flow direction and a capacitive energy store. The exemplary method includes controlling the power semiconductor switches in the switching cells in the first sub-converter system by means of a first control signal, and controlling the power semiconductor switches in the switching cells in the second sub-converter system by means of a second control signal. The exemplary method also includes forming the first control signal for the first sub-converter system from a reference signal, which is produced in a central calculation unit, with respect to the associated switching cell in the first sub-converter system. In addition, the exemplary method includes providing a local calculation unit for each switching cell in the first sub-converter system, respectively, and transmitting the reference signal with respect to the associated switching cell in the first sub-converter system to the local calculation units for the switching cells in the first sub-converter system. The exemplary method also includes forming the first control signal in each local calculation unit for the switching cells in the first sub-converter system from a first damping signal with respect to the associated switching cell in the first sub-converter system, where the first damping signal is formed from a measured current through the associated switching cell in the first sub-converter system and from a predeterminable resistance value. Furthermore, the exemplary method includes forming the second control signal for the second sub-converter system from a reference signal, which is produced in the central calculation unit, with respect to the associated switching cell in the second sub-converter system. The exemplary method also includes providing a local calculation unit for each switching cell in the second sub-converter system, and transmitting the reference signal with respect to the associated switching cell in the second sub-converter system to the local calculation units for the switching cells in the second sub-converter system. In addition, the exemplary method includes forming the second control signal in each local calculation unit for the switching cells in the second sub-converter system from a second damping signal with respect to the associated switching cell in the second sub-converter system, wherein the second damping signal is formed from a measured current through the associated switching cell in the second sub-converter system and from the predeterminable resistance value.

An exemplary embodiment provides a method for operation of a converter circuit. The converter circuit has at least two phase modules, where each phase module has a first sub-converter system and a second sub-converter system, the sub-converter systems for each phase module are connected in series with one another, each sub-converter system includes a plurality of series-connected two-pole switching cells, and each switching cell has controllable bidirectional power semiconductor switches with a controlled unidirectional current-flow direction and a capacitive energy store. The exemplary method includes controlling the power semiconductor switches in the switching cells in the first sub-converter system by means of a first control signal, and controlling the power semiconductor switches in the switching cells in the second sub-converter system by means of a second control signal. The exemplary method also includes forming the first control signal for the first sub-converter system from a first damping reference signal, which is produced in a central calculation unit, with respect to the voltage across the first sub-converter system. In addition, the exemplary method includes forming the first damping reference signal with respect to the voltage across the first sub-converter system from a first predeterminable reference current through the first sub-converter system, from a first predeterminable resistance value and from a reference signal with respect to the voltage across the first sub-converter system. The exemplary method also includes providing a local calculation unit for each switching cell in the first sub-converter system, and transmitting the first damping reference signal with respect to the voltage across the first sub-converter system to the local calculation units for the switching cells in the first sub-converter system. The first control signal is formed in each local calculation unit for the switching cells in the first sub-converter system from a first damping signal with respect to the associated switching cell in the first sub-converter system. The first damping signal is formed from a measured current through the associated switching cell in the first sub-converter system and from a second predeterminable resistance value. The second control signal is formed for the second sub-converter system from a second damping reference signal, which is produced in the central calculation unit, with respect to the voltage across the second sub-converter system. The second damping reference signal with respect to the voltage across the second sub-converter system is formed from a second predeterminable reference current through the second sub-converter system, from the first predeterminable resistance value and from a reference signal with respect to the voltage across the second sub-converter system. The exemplary method also includes providing a local calculation unit for each switching cell in the second sub-converter system, and transmitting the second damping reference signal with respect to the voltage across the second sub-converter system to the local calculation units for the switching cells in the second sub-converter system. In addition, the exemplary method includes forming the second control signal in each local calculation unit for the switching cells in the second sub-converter system from a second damping signal with respect to the associated switching cell in the second sub-converter system. The second damping signal is formed from a measured current through the associated switching cell in the second sub-converter system and from the second predeterminable resistance value.

BRIEF DESCRIPTION OF THE DRAWINGS

Additional refinements, advantages and features of the present disclosure are described in more detail below with reference to exemplary embodiments illustrated in the drawings, in which.

Figure 1:
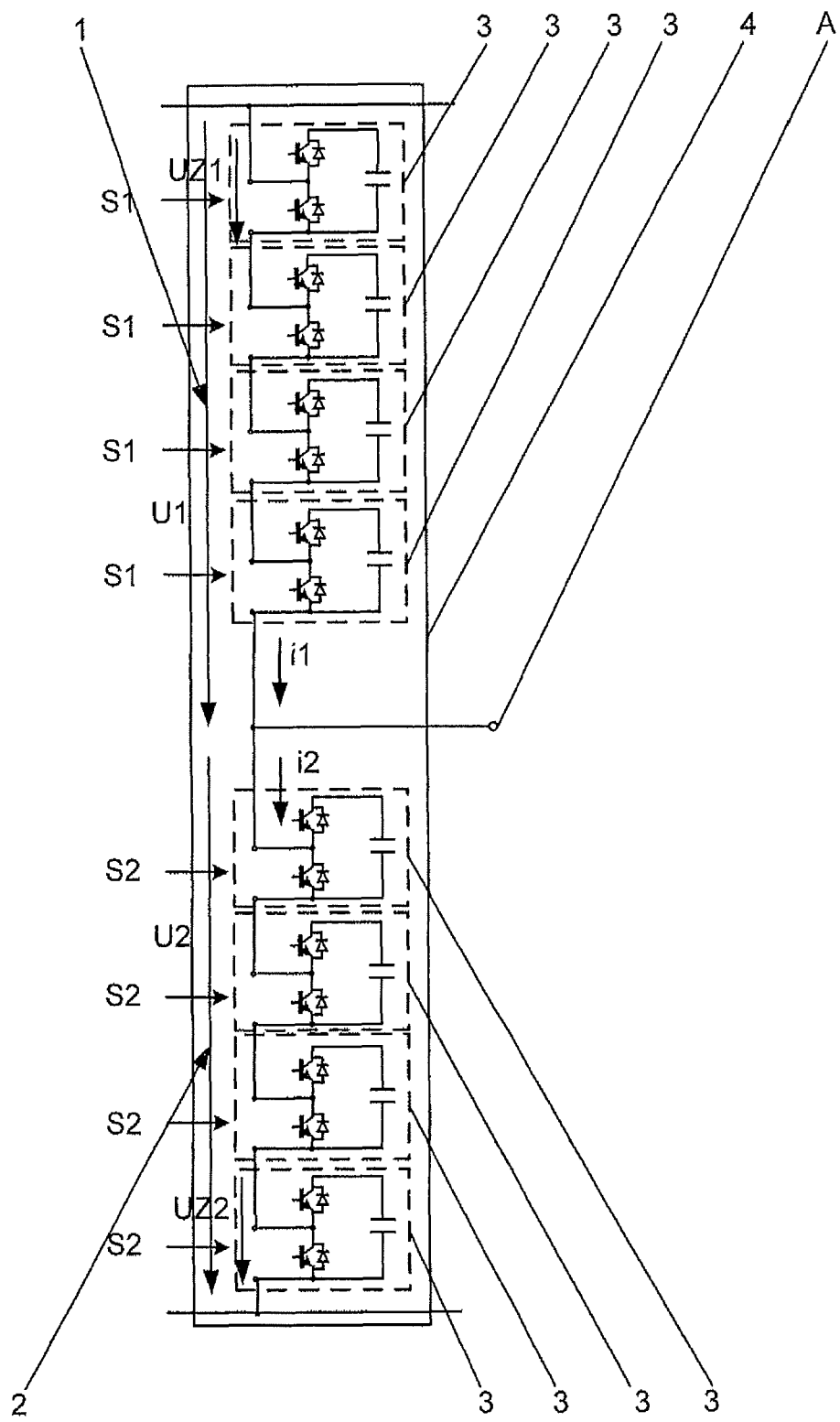
FIG. 1 shows a known converter circuit

The reference symbols used in the drawings and their meanings are listed in summary form in the list of reference symbols. In principle, the same parts are provided with the same reference symbols in the figures. The described embodiments represent examples of the subject matter according to the disclosure, and have no restrictive effect.

DETAILED DESCRIPTION

Exemplary embodiments of the present disclosure provide a method for operation of a converter circuit, by means of which undesirable oscillations and distortions in currents in first and second sub-converter systems in the converter circuit can be actively damped.

According to an exemplary embodiment, the converter circuit has at least two phase modules, where each phase module includes a first sub-converter system and a second sub-converter system. The sub-converter systems for each phase module are connected in series with one another. Each sub-converter system includes a plurality of series-connected two-pole switching cells, and each switching cell has controllable bidirectional power semiconductor switches with a controlled unidirectional current-flow direction and a capacitive energy store. In accordance with an exemplary embodiment of the method according to the present disclosure, the power semiconductor switches in the switching cells in the first sub-converter system are controlled by means of a first control signal, and the power semiconductor switches in the switching cells in the second sub-converter system are controlled by means of a second control signal. Furthermore, the first control signal for the first sub-converter system is formed from a reference signal with respect to the voltage across the first sub-converter system, and the second control signal for the second sub-converter system is formed from a reference signal with respect to the voltage across the second sub-converter system. According to an exemplary embodiment of the present disclosure, the first control signal is additionally formed from a first damping signal with respect to the first sub-converter system. The first damping signal is formed from a measured current through the first sub-converter system and from a predeterminable resistance value. Furthermore, the second control signal is additionally formed from a second damping signal with respect to the second sub-converter system. The second damping signal is formed from a measured current through the second sub-converter system and from the predeterminable resistance value.

The first and second damping signals respectively corresponds to a voltage drop across a non-reactive resistance in the associated sub-converter system, and therefore damps the currents through the respectively associated sub-converter system in a desired manner.

In accordance with an exemplary embodiment of the present disclosure, the first damping signal with respect to the first sub-converter system can be additionally formed from a predeterminable reference current through the first sub-converter system. The second damping signal with respect to the second sub-converter system can be additionally formed from a predeterminable reference current through the second sub-converter system. Presetting a reference current for the formation of the respective damping signal advantageously makes it possible to deliberately damp specific oscillation components of the currents through the respective sub-converter system.

In accordance with an exemplary embodiment of the present disclosure, the first control signal for the first sub-converter system can be formed from a reference signal, which is produced in a central calculation unit, with respect to the associated switching cell in the first sub-converter system. A local calculation unit is provided for each switching cell in the first sub-converter system, wherein the reference signal with respect to the associated switching cell in the first sub-converter system is transmitted to the local calculation units for the switching cells in the first sub-converter system. The first control signal is then additionally formed in each of the local calculation units for the switching cells in the first sub-converter system from a first damping signal with respect to the associated switching cell in the first sub-converter system. The first damping signal can be formed from a measured current through the associated switching cell in the first sub-converter system and from a predeterminable resistance value. The second control signal for the second sub-converter system can be formed from a reference signal, which is produced in the central calculation unit, with respect to the associated switching cell in the second sub-converter system. Furthermore, a local calculation unit is provided for each switching cell in the second sub-converter system. The reference signal with respect to the associated switching cell in the second sub-converter system can be transmitted to the local calculation units for the switching cells in the second sub-converter system. Furthermore, the second control signal can then be additionally formed in each of the local calculation units for the switching cells in the second sub-converter system from a second damping signal with respect to the associated switching cell in the second sub-converter system. The second damping signal can be formed from a measured current through the associated switching cell in the second sub-converter system and from the predeterminable resistance value.

The exemplary embodiment mentioned above results in the currents through the sub-converter systems advantageously being damped in the switching cells. The effect of the respective damping signal corresponds to a voltage drop across a non-reactive resistance in each switching cell, wherein the overall effect corresponds to a series circuit of non-reactive resistances, thus resulting in the currents through the respective switching cells in the associated sub-converter system being damped in the desired manner. The local measurement of the currents through the switching cells makes it possible to furthermore ensure the redundancy and therefore the availability of the damping even in the event of a failure of a current measurement, for example in one switching cell. The local formation of the control signal furthermore avoids the need for the normal transmission of the control signal to the individual switching cells.

In accordance with an exemplary embodiment of the present disclosure, the first damping signal with respect to the associated switching cell in the first sub-converter system can be additionally formed from a predeterminable reference current through the associated switching cell in the first sub-converter system, and the second damping signal with respect to the associated switching cell in the second sub-converter system can be additionally formed from a predeterminable reference current through the associated switching cell in the second sub-converter system. In addition to the advantages already mentioned above, the presetting of a reference current for the formation of the respective damping signal advantageously makes it possible to deliberately damp specific oscillation components of the currents through the switching cells in the associated sub-converter system.

In accordance with an exemplary embodiment of the present disclosure, the first control signal for the first sub-converter system can be formed from a first damping reference signal, which is produced in a central calculation unit, with respect to the voltage across the first sub-converter system. The first damping reference signal with respect to the voltage across the first sub-converter system can be formed from a predeterminable reference current through the first sub-converter system, from a predeterminable resistance value and from a reference signal with respect to the voltage across the first sub-converter system. A local calculation unit is then provided for each switching cell in the first sub-converter system. The first damping reference signal with respect to the voltage across the first sub-converter system can be transmitted to the local calculation units for the switching cells in the first sub-converter system. The first control signal can be additionally formed in each of the local calculation units for the switching cells in the first sub-converter system from a damping signal with respect to the associated switching cell in the first sub-converter system. The first damping signal can be formed from a measured current through the associated switching cell in the first sub-converter system and from a predeterminable further resistance value. Furthermore, the second control signal for the second sub-converter system can be formed from a second damping reference signal, which is produced in the central calculation unit, with respect to the voltage across the second sub-converter system. The second damping reference signal with respect to the voltage across the second sub-converter system can be formed from a predeterminable reference current through the second sub-converter system, from the predeterminable resistance value and from a reference signal with respect to the voltage across the second sub-converter system. Furthermore, a local calculation unit can then be provided for each switching cell in the second sub-converter system. The second damping reference signal with respect to the voltage across the second sub-converter system can be transmitted to the local calculation units for the switching cells in the second sub-converter system. Furthermore, the second control signal can be additionally formed in each of the local calculation units for the switching cells in the second sub-converter system from a second damping signal with respect to the associated switching cell in the second sub-converter system. The second damping signal can be formed from a measured current through the associated switching cell in the second sub-converter system and from the predeterminable further resistance value. In accordance with this exemplary embodiment, specific oscillation components of the currents through the switching cells in the associated sub-converter system can thus be selectively damped. Furthermore, the reference current is advantageously not transmitted to the local calculation units.

As was already mentioned initially, FIG. 1 shows a known converter circuit. In general, the converter circuit has at least two phase modules 4, wherein each phase module 4 includes a first and a second sub-converter system 1, 2, and the sub-converter systems 1, 2 for each phase module 4 are connected in series with one another. Each sub-converter system 1, 2 includes a plurality of series-connected two-pole switching cells 3, and each switching cell 3 has controllable bidirectional power semiconductor switches with a controlled unidirectional current-flow direction and a capacitive energy store. Furthermore, it is possible for each sub-converter system 1, 2 to have an inductance in series with the series circuit in the switching cells 3. The controllable power semiconductor switch in the switching cells 3 in the sub-converter systems 1, 2 can be, for example, in the form of a gate turn-off thyristor (GTO), or an integrated thyristor with a commutated control electrode (IGCT—Integrated Gate Commutated Thyristor), in each case having a diode connected back-to-back in parallel. However, it is also feasible for a controllable power semiconductor switch to be, for example, in the form of a power MOSFET with a diode additionally connected back-to-back in parallel, or a bipolar transistor with an insulated gate electrode (IGBT), with a diode additionally connected back-to-back in parallel. The number of switching cells 3 in the first sub-converter system 1 can correspond to the number of switching cells 3 in the second sub-converter system 2.

Figure 2:
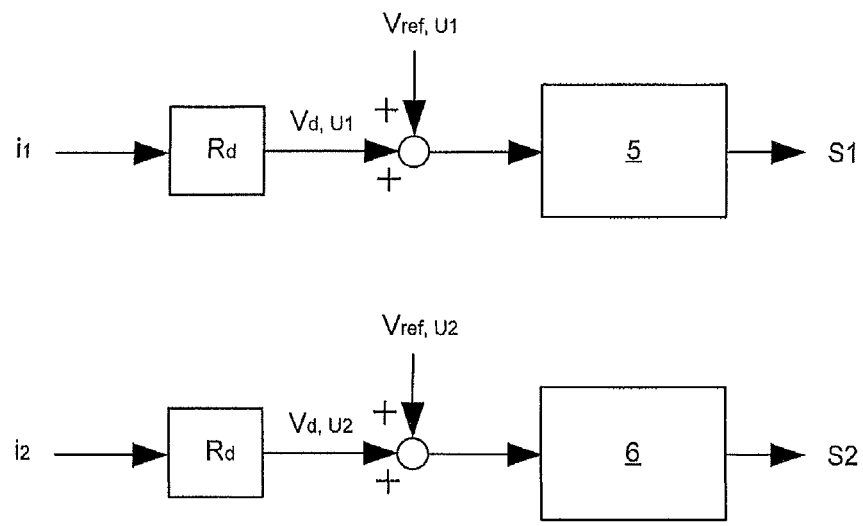
FIG. 2 shows an exemplary embodiment of an apparatus for carrying out method according to the present disclosure for operation of a converter circuit.

FIG. 2 shows an exemplary embodiment of an apparatus for carrying out a method according to the present disclosure for operation of a converter circuit. According to the exemplary method, the power semiconductor switches in the switching cells 3 in the first sub-converter system 1 are controlled by means of a first control signal S1, and the power semiconductor switches in the switching cells 3 in the second sub-converter system 2 are controlled by means of a second control signal S2. The first control signal S1 for the first sub-converter system 1 is formed from a reference signal $V_{ref, U1}$ with respect to the voltage U1 across the first sub-converter system 1. The second control signal S2 for the second sub-converter system 2 is formed from a reference signal $V_{ref, U2}$ with respect to the voltage U2 across the second sub-converter system 2. As shown in FIG. 2, the first control signal S1 is additionally formed from a damping signal $V_{d, U1}$ with respect to the first sub-converter system 1, wherein the damping signal $V_{d, U1}$ is formed from a measured current i1 through the first sub-converter system 1, and from a predeterminable resistance value $R_d$. The damping signal $V_{d, U1}$ is formed in accordance with the following formula:

$$V_{d, U1} = i1 \cdot R_d \quad [1]$$

The second control signal S2, as shown in FIG. 2, is additionally formed from a damping signal $V_{d, U2}$ with respect to the second sub-converter system 2, wherein the damping signal $V_{d, U2}$ is formed from a measured current i2 through the second sub-converter system 2 and from the predeterminable resistance value $R_d$. The damping signal $V_{d, U2}$ is formed in accordance with the following formula:

$$V_{d, U2}i = 2 \cdot R_d \quad [2]$$

The effect of the respective damping signal $V_{d, U1}$, $V_{d, U2}$ corresponds to a voltage drop across a non-reactive resistance in the associated sub-converter system 1, 2, and therefore damps the currents i1, i2 through the respectively associated sub-converter system 1, 2 in a desired manner.

Figure 4:
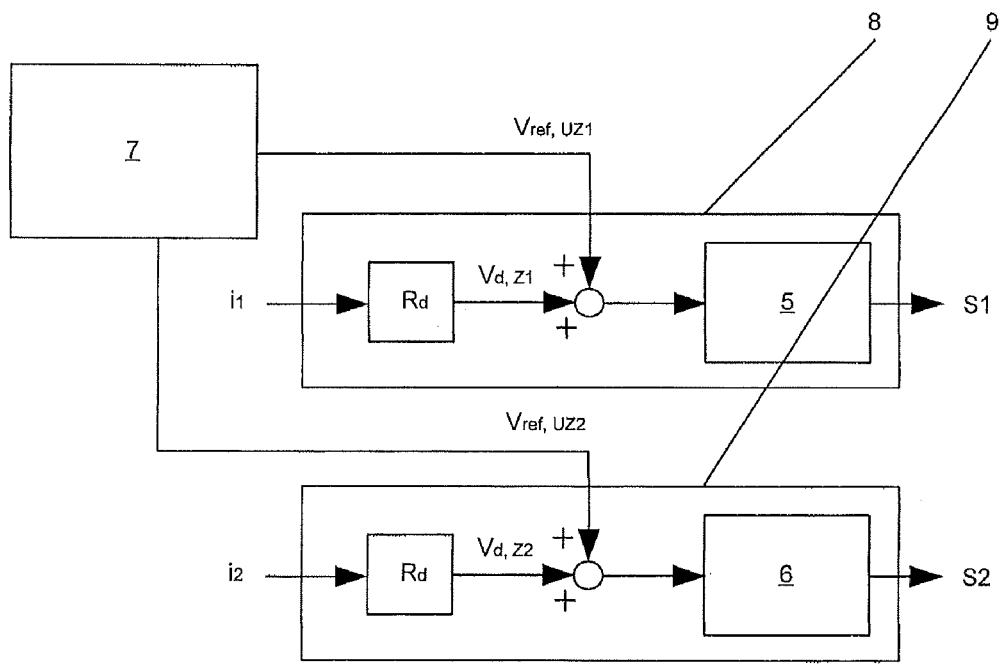
FIG. 4 shows an exemplary embodiment of an apparatus for carrying out a method according to the present disclosure for operation of a converter circuit.
Figure 5:
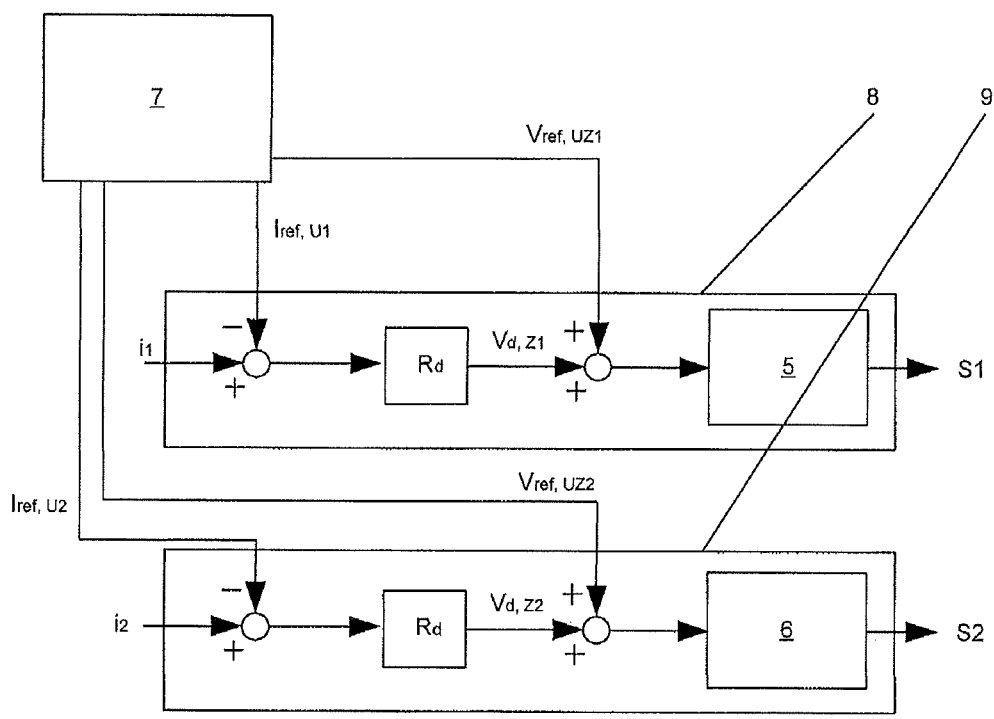
FIG. 5 shows an exemplary embodiment of an apparatus for carrying out a method according to the present disclosure for operation of a converter circuit.

As shown in FIG. 2, the sum is formed from the damping signal $V_{d, U1}$ with respect to the first sub-converter system 1 and from the reference signal $V_{ref, U1}$ with respect to the voltage U1 across the first sub-converter system 1 and is passed to a modulator 5 which generates the control signal S1 therefrom. Furthermore, as shown in FIG. 2, the sum is formed from the damping signal $V_{d, U2}$ with respect to the second sub-converter system 2 and from the reference signal $V_{ref, U2}$ with respect to the voltage U2 across the second sub-converter system 2, and is passed to a modulator 6, which generates the second control signal S2 therefrom. According to an exemplary embodiment, any modulator, such as pulse-width modulators, modulators based on carrier methods, space-vector modulators or modulators with a hysteresis characteristic may be used as modulators 5, 6 in FIG. 2, or else in the exemplary embodiments as shown in FIG. 3 to FIG. 5.

Figure 3:
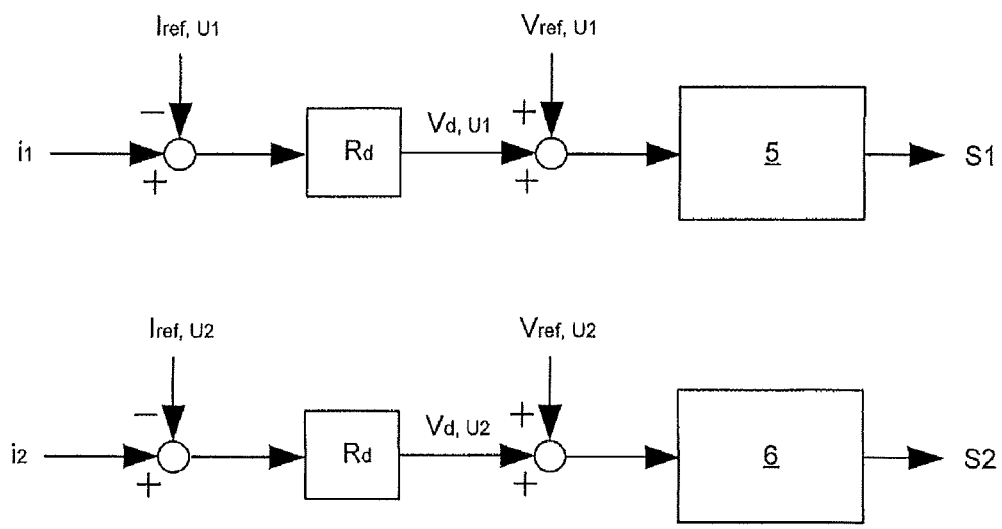
FIG. 3 shows an exemplary embodiment of an apparatus for carrying out a method according to the present disclosure for operation of a converter circuit.

FIG. 3 illustrates an exemplary embodiment of an apparatus for carrying out a method according to the present disclosure for operation of a converter circuit. In the example of FIG. 3, the damping signal $V_{d, U1}$ with respect to the first sub-converter system 1 can additionally be formed from a predeterminable reference current $I_{ref, U1}$ through the first sub-converter system 1. The damping signal $V_{d, U1}$ can formed in accordance with the following formula:

$$V_{d, U1} = (i1 - I_{ref, U1}) \cdot R_d \quad [3]$$

As shown in FIG. 3, the damping signal $V_{d, U2}$ with respect to the second sub-converter system 2 can additionally be formed from a predeterminable reference current $I_{ref, U2}$ through the second sub-converter system 2. The damping signal $V_{d, U2}$ can formed in accordance with the following formula:

$$V_{d, U2} = (i1 - I_{ref, U2}) \cdot R_d \quad [4]$$

The first control signal S1 and the second control signal S2 can then be formed as shown in FIG. 3, in a corresponding manner to that in FIG. 2.

The presetting of a reference current $I_{ref, U1}$, $I_{ref, U2}$ for the formation of the respective damping signal $V_{d, U1}$, $V_{d, U2}$ advantageously makes it possible for specific oscillation components of the currents i1, i2 through the respective sub-converter system to be deliberately damped.

FIG. 4 shows an exemplary embodiment of an apparatus for carrying out a method according to the present disclosure for operation of a converter circuit, illustrating an alternative to the exemplary embodiments shown in FIG. 2 and FIG. 3. As shown in FIG. 4, the first control signal S1 for the first sub-converter system 1 can be formed from a reference signal $V_{ref, UZ1}$, which is produced in a central calculation unit 7, with respect to the associated switching cell 3 in the first sub-converter system 1. A local calculation unit 8 can then be provided for each switching cell 3 in the first sub-converter system 1, wherein the reference signal $V_{ref, UZ1}$ with respect to the associated switching cell 3 in the first sub-converter system 1 can be transmitted to the local calculation units 8 for the switching cells 3 in the first sub-converter system 1. Furthermore, the first control signal S1 can additionally be formed in each local calculation unit 8 for the switching cells 3 in the first sub-converter system 1 from a damping signal $V_{d, Z1}$ with respect to the associated switching cell 3 in the first sub-converter system 1, wherein the damping signal $V_{d, Z1}$ can be formed from a measured current i1 through the associated switching cell 3 in the first sub-converter system 1 and from a predeterminable resistance value $R_d$. The damping signal $V_{d, Z1}$ can be formed in accordance with the following formula:

$$V_{d,Z1} = i1 \cdot R_d \quad [5]$$

As shown in the example of FIG. 4, the second control signal S2 for the second sub-converter system 2 can be formed from a reference signal $V_{ref, UZ2}$, which is produced in the central calculation unit 7, with respect to the associated switching cell 3 in the second sub-converter system 2. A local calculation unit 9 can be provided for each switching cell 3 in the second sub-converter system 2, wherein the reference signal $V_{ref, UZ2}$ with respect to the associated switching cell 3 in the second sub-converter system 2 can be transmitted to the local calculation units 9 for the switching cells 3 in the second sub-converter system 2. Furthermore, the second control signal S2 can additionally be formed in each local calculation unit 9 for the switching cells 3 in the second sub-converter system 2 from a damping signal $V_{d, Z2}$ with respect to the associated switching cell 3 in the second sub-converter system 2, wherein the damping signal $V_{d, Z2}$ can be formed from a measured current i2 through the associated switching cell 3 in the second sub-converter system 2 and from the predeterminable resistance value $R_d$. The damping signal $V_{d,Z2}$ can be formed in accordance with the following formula:

$$V_{d,Z2} i = 1 \cdot R_d \quad [6]$$

The alternative mentioned above and as shown in FIG. 4 results in the currents i1, i2 through the sub-converter systems 1, 2 advantageously being damped in the switching cells 3. The effect of the respective damping signal $V_{d, Z1}$, $V_{d, Z2}$ corresponds to a voltage drop across a non-reactive resistance in each switching cell 3, wherein the overall effect corresponds to a series circuit of non-reactive resistances, by which the currents i1, i2 through the respective switching cells 3 in the associated sub-converter systems 1, 2 can be damped in the desired manner. The local measurement of the currents i1, i2 through the switching cells 3 furthermore makes it possible to ensure the redundancy and therefore the availability of the damping even in the event of a failure of a current measurement, for example, in a switching cell 3. Furthermore, the local formation of the first and/or second control signal(s) S1, S2 avoids the need for the normal transmission of the control signal(s) S1, S2 to the individual switching cells 3, for example, from a central or superordinate unit.

As shown in the example of FIG. 4, the sum can be formed from the damping signal $V_{d, Z1}$ with respect to the associated switching cell 3 in the first sub-converter system 1 and from the reference signal $V_{ref, UZ1}$ with respect to the associated switching cell 3 in the first sub-converter system 1, and can be passed to a modulator 5, which generates the first control signal S1 therefrom. Furthermore, as shown in FIG. 4, the sum can be formed from the damping signal $V_{d, Z2}$ with respect to the second sub-converter system 2 and from the reference signal $V_{ref, UZ2}$ with respect to the associated switching cell 3 in the second sub-converter system 2, and be passed to a modulator 6, which generates the second control signal S2 therefrom.

FIG. 5 shows an exemplary embodiment of an apparatus for carrying out a method according to the present disclosure for operation of a converter circuit. In the exemplary embodiment of FIG. 5, the damping signal $V_{d, Z1}$ with respect to the associated switching cell 3 in the first sub-converter system 1 can additionally be formed from a predeterminable reference current $I_{ref, U1}$ through the associated switching cell 3 in the first sub-converter system 1. The predeterminable reference current $I_{ref, U1}$ through the associated switching cell 3 in the first sub-converter system 1 can be transmitted to the local calculation units 8 for the switching cells 3 in the first sub-converter system 1. The damping signal $V_{d, Z1}$ can be formed in accordance with the following formula:

$$V_{d,Z1} = (i1 - I_{ref, U1}) \cdot R_d \quad [7]$$

As shown in the example of FIG. 5, the respective damping signal $V_{d, Z2}$ with respect to the associated switching cell 3 in the second sub-converter system 2 can additionally be formed from a predeterminable reference current $I_{ref, U2}$ through the associated switching cell 3 in the second sub-converter system 2. The predeterminable reference current $I_{ref, U2}$ through the associated switching cell 3 in the second sub-converter system 2 can be transmitted to the local calculation units 9 for the switching cells 3 in the second sub-converter system 1. The damping signal $V_{d, Z2}$ can be formed in accordance with the following formula:

$$V_{d,Z2} = (i1 - I_{ref, U2}) \cdot R_d \quad [8]$$

The first control signal S1 and the second control signal S2 can then be formed as shown in FIG. 5, in a corresponding manner to that in FIG. 4.

According to an exemplary embodiment, the resistance value $R_d$ can be predetermined to be constant or variable over time.

Figure 6:
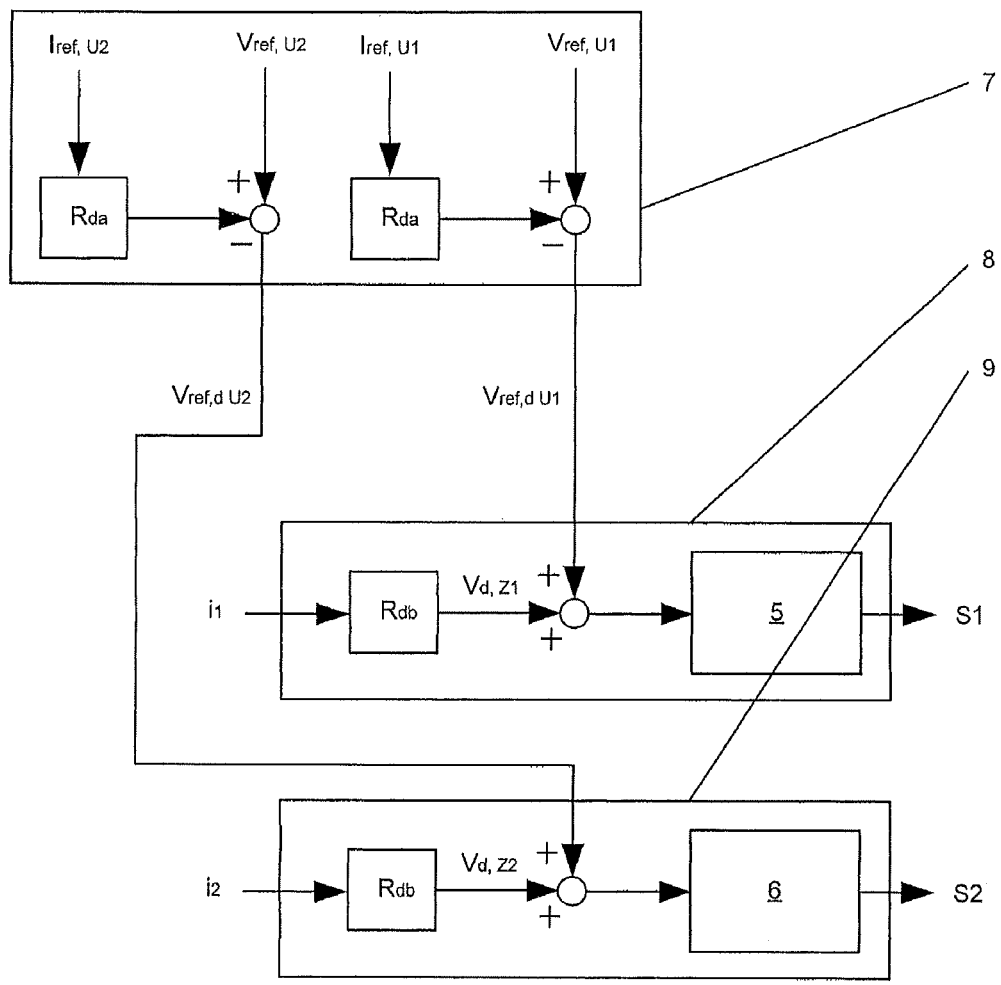
FIG. 6 shows an exemplary embodiment of an apparatus for carrying out a method according to the disclosure for operation of a converter circuit.

FIG. 6 shows an exemplary embodiment of an apparatus for carrying out a method according to the present disclosure for operation of a converter circuit, which represents an alternative to the exemplary embodiments shown in FIG. 2, FIG. 3, FIG. 4 and FIG. 5. As shown in FIG. 6, the first control signal S1 for the first sub-converter system 1 can be formed from a damping reference signal $V_{ref,d\ U1}$, which is produced in a central calculation unit 7, with respect to the voltage U1 across the first sub-converter system 1, wherein the damping reference signal $V_{ref,d\ U1}$ with respect to the voltage U1 across the first sub-converter system 1 can be formed from a predeterminable reference current $i_{ref, U1}$ through the first sub-converter system 1, from a predeterminable resistance value $R_{da}$ and from a reference signal $V_{ref, U1}$ with respect to the voltage U1 across the first sub-converter system 1. The damping signal $V_{ref,d\ U1}$ can be formed in accordance with the following formula:

$$V_{ref,d\ U1} = V_{ref, U1} = (i_{ref, U1} \cdot R_{da}) \quad [9]$$

Furthermore, a local calculation unit 8 can be provided for each switching cell 3 in the first sub-converter system 1 as shown in FIG. 6, wherein the damping reference signal $V_{ref,d\ U1}$ with respect to the voltage U1 across the first sub-converter system 1 can be transmitted to the local calculation units 8 for the switching cells 3 in the first sub-converter system 1. The first control signal S1 can additionally be formed in each of the local calculation units 8 for the switching cells 3 in the first sub-converter system 1 from a damping signal $V_{d, Z1}$ with respect to the associated switching cell 3 in the first sub-converter system 1, wherein the damping signal $V_{d, Z1}$ can be formed from a measured current i1 through the associated switching cell 3 in the first sub-converter system 1 and from a predeterminable further resistance value $R_{db}$. The damping signal $V_{d, Z1}$ can be formed in accordance with the following formula:

$$V_{d, Z1} = i1 \cdot R_{db} \quad [10]$$

As shown in the example of FIG. 6, the sum can be formed from the damping signal $V_{d, Z1}$ with respect to the associated switching cell 3 in the first sub-converter system 1 and from the damping reference signal $V_{ref,d\ U1}$ with respect to the voltage U1 across the first sub-converter system 1, and can be passed to a modulator 5, which generates the control signal S1 therefrom.

As shown in the example of FIG. 6, the second control signal S2 for the second sub-converter system 2 can be formed from a damping reference signal $V_{ref,d\ U2}$, which is produced in the central calculation unit 9, with respect to the voltage U2 across the second sub-converter system 2, wherein the damping reference signal $V_{ref,d\ U2}$ with respect to the voltage U2 across the second sub-converter system 2 can be formed from a predeterminable reference current $i_{ref,\ U2}$ through the second sub-converter system 2, from the predeterminable resistance value $R_{da}$ and from a reference signal $V_{ref,\ U2}$ with respect to the voltage U2 across the second sub-converter system 2. The damping signal $V_{ref,d\ U2}$ can be formed in accordance with the following formula:

$$V_{ref,d\ U2} = V_{ref,\ U2} - (i_{ref,\ U2} \cdot R_{da}) \quad [11]$$

As shown in the example of FIG. 6, a local calculation unit 9 can be provided for each switching cell 3 in the second sub-converter system 2, and the damping reference signal $V_{ref,d\ U2}$ with respect to the voltage U2 across the second sub-converter system 2 can be transmitted to the local calculation units 9 for the switching cells 3 in the second sub-converter system 2. The second control signal S2 can additionally be formed, as shown in FIG. 6, in each of the local calculation units 9 for the switching cells 3 in the second sub-converter system 2 from a damping signal $V_{d,\ Z2}$ with respect to the associated switching cell 3 in the second sub-converter system 2, wherein the damping signal $V_{d,\ Z2}$ can be formed from a measured current i2 through the associated switching cell 3 in the second sub-converter system 2 and from the predeterminable further resistance value $R_{db}$. The damping signal $V_{d,\ Z2}$ can be formed in accordance with the following formula:

$$V_{d,\ Z2} = i2 \cdot R_{db} \quad [12]$$

As shown in the example of FIG. 6, the sum can be formed from the damping signal $V_{d,\ Z2}$ with respect to the associated switching cell 3 in the second sub-converter system 2 and from the damping reference signal $V_{ref,d\ U2}$ with respect to the voltage U2 across the second sub-converter system 2, and can be passed to a modulator 6, which then generates the second control signal S2 therefrom.

The exemplary embodiment as shown in FIG. 6 also makes it possible to selectively damp specific oscillation components in the currents i1, i2 through the switching cells 3 in the associated sub-converter system 1, 2. Furthermore, the respective reference current $i_{ref,\ U1}$, $i_{ref,\ U2}$ is advantageously not transmitted to the local calculation units 8, 9. The resistance value $R_{da}$ can be chosen such that it increases the contribution of the respective reference current $i_{ref,\ U1}$, $i_{ref,\ U2}$ with respect to the damping signal $V_{d,\ Z1}$, $V_{d,\ Z2}$ which is formed in the respectively associated local calculation unit 8, 9.

According to an exemplary embodiment, the resistance value $R_{da}$ and the further resistance value $R_{db}$ can be predetermined to be constant or variable over time.

In an entirely general form, it is also feasible for the respective damping signal $V_{d,\ U1}$, $V_{d,\ U2}$, $V_{d,\ Z1}$, $V_{d,\ Z2}$ to be predetermined in accordance with a general function, in which case a function such as this can then, for example, contain a constant component, a component which varies over time, an integral component, a differential component, a reference component and a previous value of the respective damping signal, or a combination of the options stated above.

It will be appreciated by those skilled in the art that the present invention can be embodied in other specific forms without departing from the spirit or essential characteristics thereof. The presently disclosed embodiments are therefore considered in all respects to be illustrative and not restricted.

The scope of the invention is indicated by the appended claims rather than the foregoing description and all changes that come within the meaning and range and equivalence thereof are intended to be embraced therein.

LIST OF REFERENCE SYMBOLS

1 First sub-converter system
2 Second sub-converter system
3 Switching cell
4 Phase module
5, 6 Modulator
7 Central calculation unit
8, 9 Local calculation unit

What is claimed:

1. A method for operation of a converter circuit, wherein the converter circuit has at least two phase modules, each phase module having a first sub-converter system and a second sub-converter system, the sub-converter systems for each phase module being connected in series with one another, each sub-converter system including a plurality of series-connected two-pole switching cells, and each switching cell having controllable bidirectional power semiconductor switches with a controlled unidirectional current-flow direction and a capacitive energy store, the method comprising:
  controlling the power semiconductor switches in the switching cells in the first sub-converter system by means of a first control signal;
  controlling the power semiconductor switches in the switching cells in the second sub-converter system by means of a second control signal;
  forming the control signal for the first sub-converter system formed from a reference signal with respect to the voltage across the first sub-converter system; and
  forming the second control signal for the second sub-converter system from a reference signal with respect to the voltage across the second sub-converter system,
  wherein the first control signal is additionally formed from a first damping signal with respect to the first sub-converter system, the first damping signal being formed from a measured current through the first sub-converter system and from a predeterminable resistance value, and
  wherein the second control signal is additionally formed from a second damping signal with respect to the second sub-converter system, the second damping signal being formed from a measured current through the second sub-converter system and from the predeterminable resistance value.

2. The method as claimed in claim 1, wherein the first damping signal with respect to the first sub-converter system is additionally formed from a predeterminable reference current through the first sub-converter system, and
  the second damping signal with respect to the second sub-converter system is additionally formed from a predeterminable reference current through the second sub-converter system.

3. A method for operation of a converter circuit, wherein the converter circuit has at least two phase modules, each phase module having a first sub-converter system and a second sub-converter system, the sub-converter systems for each phase module being connected in series with one another, each sub-converter system including a plurality of series-connected two-pole switching cells, and each switching cell having controllable bidirectional power semiconductor switches with a controlled unidirectional current-flow direction and a capacitive energy store, the method comprising:

controlling the power semiconductor switches in the switching cells in the first sub-converter system by means of a first control signal;

controlling the power semiconductor switches in the switching cells in the second sub-converter system by means of a second control signal;

forming the first control signal for the first sub-converter system from a reference signal, which is produced in a central calculation unit, with respect to the associated switching cell in the first sub-converter system;

providing a local calculation unit for each switching cell in the first sub-converter system, respectively;

transmitting the reference signal with respect to the associated switching cell in the first sub-converter system to the local calculation units for the switching cells in the first sub-converter system;

forming the first control signal in each local calculation unit for the switching cells in the first sub-converter system from a first damping signal with respect to the associated switching cell in the first sub-converter system, the first damping signal being formed from a measured current through the associated switching cell in the first sub-converter system and from a predeterminable resistance value;

forming the second control signal for the second sub-converter system from a reference signal, which is produced in the central calculation unit, with respect to the associated switching cell in the second sub-converter system;

providing a local calculation unit for each switching cell in the second sub-converter system;

transmitting the reference signal with respect to the associated switching cell in the second sub-converter system to the local calculation units for the switching cells in the second sub-converter system; and forming the second control signal in each local calculation unit for the switching cells in the second sub-converter system from a second damping signal with respect to the associated switching cell in the second sub-converter system, wherein the second damping signal is formed from a measured current through the associated switching cell in the second sub-converter system and from the predeterminable resistance value.

4. The method as claimed in claim 3, wherein the first damping signal with respect to the associated switching cell in the first sub-converter system is additionally formed from a predeterminable reference current through the associated switching cell in the first sub-converter system, and the second damping signal with respect to the associated switching cell in the second sub-converter system is additionally formed from a predeterminable reference current through the associated switching cell in the second sub-converter system.

5. The method as claimed in claim 4, wherein the resistance value is preset to be constant or variable over time.

6. A method for operation of a converter circuit, wherein the converter circuit has at least two phase modules, each phase module having a first sub-converter system and a second sub-converter system, the sub-converter systems for each phase module being connected in series with one another, each sub-converter system including a plurality of series-connected two-pole switching cells, and each switching cell having controllable bidirectional power semiconductor switches with a controlled unidirectional current-flow direction and a capacitive energy store, the method comprising:

controlling the power semiconductor switches in the switching cells in the first sub-converter system by means of a first control signal;

controlling the power semiconductor switches in the switching cells in the second sub-converter system by means of a second control signal;

forming the first control signal for the first sub-converter system from a first damping reference signal, which is produced in a central calculation unit, with respect to the voltage across the first sub-converter system;

forming the first damping reference signal with respect to the voltage across the first sub-converter system from a first predeterminable reference current through the first sub-converter system, from a first predeterminable resistance value and from a reference signal with respect to the voltage across the first sub-converter system;

providing a local calculation unit for each switching cell in the first sub-converter system;

transmitting the first damping reference signal with respect to the voltage across the first sub-converter system to the local calculation units for the switching cells in the first sub-converter system;

forming the first control signal in each local calculation unit for the switching cells in the first sub-converter system from a first damping signal with respect to the associated switching cell in the first sub-converter system, wherein the first damping signal is formed from a measured current through the associated switching cell in the first sub-converter system and from a second predeterminable resistance value;

forming the second control signal for the second sub-converter system from a second damping reference signal, which is produced in the central calculation unit, with respect to the voltage across the second sub-converter system, wherein the second damping reference signal with respect to the voltage across the second sub-converter system is formed from a second predeterminable reference current through the second sub-converter system, from the first predeterminable resistance value and from a reference signal with respect to the voltage across the second sub-converter system;

providing a local calculation unit for each switching cell in the second sub-converter system;

transmitting the second damping reference signal with respect to the voltage across the second sub-converter system to the local calculation units for the switching cells in the second sub-converter system; and forming the second control signal in each local calculation unit for the switching cells in the second sub-converter system from a second damping signal with respect to the associated switching cell in the second sub-converter system, wherein the second damping signal is formed from a measured current through the associated switching cell in the second sub-converter system and from the second predeterminable resistance value.

7. The method as claimed in claim 6, wherein the first resistance value and the second resistance value are predetermined to be constant or variable over time.

8. The method as claimed in claim 1, wherein the resistance value is preset to be constant or variable over time.

9. The method as claimed in claim 2, wherein the resistance value is preset to be constant or variable over time.

10. The method as claimed in claim 3, wherein the resistance value is preset to be constant or variable over time.

* * * * *